Oct. 11, 1932. Z. KURIYAMA 1,881,698
ELECTRIC SOLDERING IRON
Filed May 4, 1929

INVENTOR
Z. KURIYAMA
BY J. MacDonald
ATTORNEY

Patented Oct. 11, 1932

1,881,698

UNITED STATES PATENT OFFICE

ZENSUKE KURIYAMA, OF HIGASHICHOFUCHO, TOKYO-FU, JAPAN, ASSIGNOR TO WESTERN ELECTRIC COMPANY, INCORPORATED, OF NEW YORK, N. Y., A CORPORATION OF NEW YORK

ELECTRIC SOLDERING IRON

Application filed May 4, 1929, Serial No. 360,583, and in Japan May 28, 1928.

This invention relates to soldering irons.

Its object is to provide an electric soldering iron of light weight and in which the tip may be adjusted on its supporting frame in a number of convenient positions with respect to the work, and brought to working temperature in a minimum of time.

According to this invention the soldering tip extends from a copper head placed between two heaters which are insulatedly mounted in a pair of metal frames in turn heat insulated from a common holder by plates of asbestos. This holder is in the form of two shells, one of which is permanently secured to one end of a tubing. These shells have in one of their ends interlocking portions for locking them in their assembled-relation at that end, and a collar which is loosely mounted on the tubing is provided for securing one end of the removable shell on the tubing when placed in adjusted position thereon. The shells are provided on three sides with registering notches for positioning and positively holding the copper head in any one of three positions, that is, in coaxial alignment with the longitudinal axis of the tubing and in a plurality of angular positions therefrom. On the free end of the tubing is mounted a handle having a longitudinal centrally disposed aperture through which the electric conductors pass for connection with the terminals of the heating elements.

Figure 1:
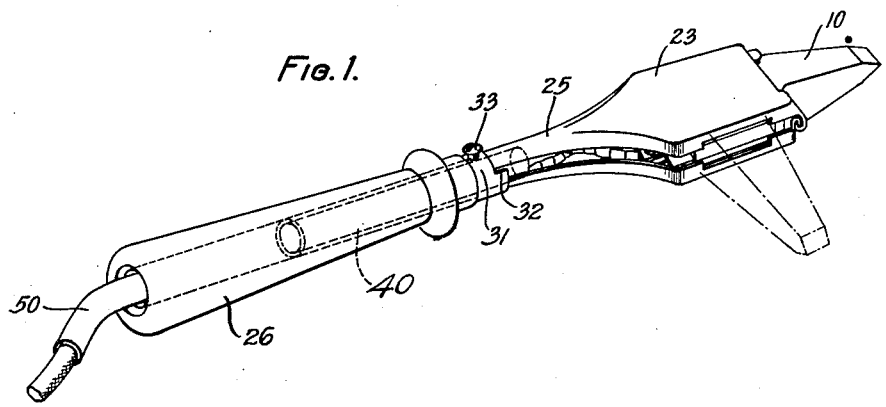
Figure 2:
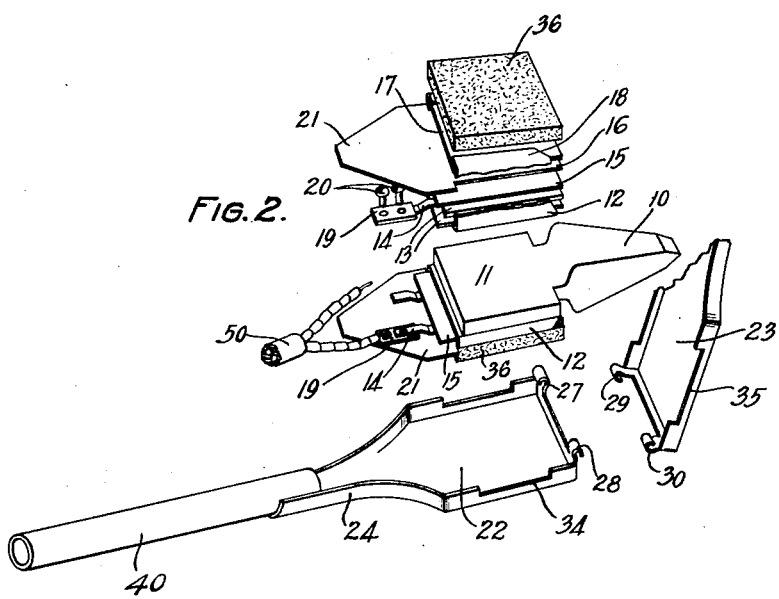

In the accompanying drawing Fig. 1 is a perspective assembly view of the soldering iron, and Fig. 2 is an exploded view of the component parts of the iron shown in perspective. In the soldering iron of this invention the tip or working surface 10 is formed integrally with a flat head portion 11 adapted to be secured between two similar heaters in a manner that will be hereinafter described in detail.

Each heater comprises a metal frame 12, the sheets of mica 13, a heating element 14, sheets of mica 15 and 16, and a metallic plate 17, the whole being held securely as a unit by bent over portions such as 18 which extend from frame 12, as shown in Fig. 2.

The ends of the heating elements 14 carry terminals 19 for securing similar ends of the heating elements to lead-in conductor cords 50, by means of screws 20.

The mica sheet 16 of each unit is provided with a tongue portion 21 which overlaps the cord terminals for insulating them from the holder.

As shown in Figs. 1 and 2, the holder comprises two square shaped shells 22 and 23, each having a semi-circular constricted portion 24 and 25, respectively. The constricted portion 24 of shell 22 is secured as by welding to a tubing 40 provided for receiving the handle 26. Shells 22 and 23 have cooperating hook members 27, 29 and 28, 30 for holding the shells securely at their free ends.

A collar 31 shown in Fig. 1 is mounted on the constricted portion of shell 22 and carries a lug portion 32 which, when the collar is turned substantially 90° from the position shown in Fig. 1 in a clockwise direction, overlaps the constricted end 25 of shell 23 for locking it in the position in Fig. 1, the screw 33 being provided for securing the collar 31 in the engaged position with the end 25 of shell 23.

The shells 22 and 23 are each provided on three sides with registering notches such as 34 and 35 for placing and holding the copper head positively in any one of three positions, that is, in coaxial alignment with the handle and angularly thereto substantially 90° from that aligned position. The space between the edges of the shells 22 and 23 when in their closed position as shown in Fig. 1 is provided to permit the ventilation of the holder and that portion of the tubing which protrude from the handle, and a plate 36 of asbestos is provided in each shell 22 and 23 for insulating them from the heater units.

What is claimed is:

1. In a soldering iron, a head having a tip extending therefrom, a frame therefor comprising plates, each of said plates having a reduced end, a tubing secured to the reduced end of one of said plates, a pair of interlocking hooks carried by each of said plates, a handle mounted on one end of said tubing, a collar arranged for movement on said tubing and having a lug for engagement with the reduced end of one of said plates and cooperating with the hooks for holding it securely to the other plate, and means in each of said plates cooperating to hold the head in a number of predetermined right angled positions with respect to the direction of said handle.

2. In a soldering iron, a copper head having a tip extending therefrom, a frame comprising interlocking plates, each of said plates having a reduced end, a tubing having one end secured to the reduced end of one of said plates, a handle mounted on the other end of said tubing, and a collar mounted on said tubing and having a lug portion adapted to engage the reduced end of the other plate upon a rotary movement of the collar for securing the head between said plates.

In witness whereof, I hereunto subscribe my name this thirteenth day of April, 1929.

ZENSUKE KURIYAMA.